US012710438B2

(12) United States Patent
Hagai

(10) Patent No.: US 12,710,438 B2
(45) Date of Patent: Aug. 18, 2026

(54) POSITIONING SYSTEM

(71) Applicant: Applied Materials Israel Ltd., Rehovot (IL)

(72) Inventor: Ronen Hagai, Kiryat Ekron (IL)

(73) Assignee: Applied Materials Israel Ltd., Rehovot (IL)

( * ) Notice: Subject to any disclaimer, the term of this patent is extended or adjusted under 35 U.S.C. 154(b) by 275 days.

(21) Appl. No.: 18/198,778

(22) Filed: May 17, 2023

(65) Prior Publication Data

US 2024/0385203 A1 Nov. 21, 2024

(51) Int. Cl.
*G01N 35/04* (2006.01)
*G01N 35/00* (2006.01)

(52) U.S. Cl.
CPC ... *G01N 35/04* (2013.01); *G01N 2035/00445* (2013.01); *G01N 2035/0475* (2013.01); *G01N 2035/0477* (2013.01); *G01N 2035/0491* (2013.01)

(58) Field of Classification Search
CPC .. H02K 9/00; H02K 9/16; H02K 9/19; H02K 9/22; H02K 41/00; H02K 41/02; H02K 41/03; H02K 41/031; H02K 41/0354; H02K 41/0356; H02K 3/00; H02K 3/24; H02K 3/28; H02K 3/47; H02K 17/06; H02K 17/14; H02K 19/12; H02K 19/32; G03F 7/70875; G03F 7/70758; G01N 35/00; G01N 35/04; G02B 7/00; G02B 7/02; G02B 7/18
See application file for complete search history.

(56) References Cited

U.S. PATENT DOCUMENTS

2003/0156270 A1 8/2003 Hunter
2006/0049700 A1 3/2006 Moriyama
(Continued)

FOREIGN PATENT DOCUMENTS

CN 1433127 A 7/2003
CN 1485702 A * 3/2004 ............ H02K 41/03
CN 217824628 U 11/2022
(Continued)

OTHER PUBLICATIONS

KR10-2024-0064611, "Notice of Decision to Grant", Nov. 19, 2025, 2 pages.

*Primary Examiner* — Oluseye Iwarere
*Assistant Examiner* — Nicholas Lee Setzer
(74) *Attorney, Agent, or Firm* — Kilpatrick Townsend & Stockton LLP

(57) ABSTRACT

A positioning system that includes (a) a linear motor that includes a movable magnetic unit and a coil stator, the coil stator includes a group of coil stator segments; wherein the mechanical support unit is mechanically coupled to the movable magnetic unit; (b) a mechanical support element for supporting a sample within a vacuum chamber; (c) a power supply that is configured to independently supply power to different coil stator segments of the coil stator segments to induce a movement of the movable magnetic unit in relation to the coil stator, along a axis; (d) a heat reduction element that is configured to reduce a temperature of the coil stator; and (e) a controller that is configured to control the movement of the movable magnetic unit by controlling the supply of power to the different coil stator segments.

12 Claims, 7 Drawing Sheets

(56) References Cited

U.S. PATENT DOCUMENTS

| | | | | |
|---|---|---|---|---|
| 2012/0113405 | A1* | 5/2012 | Yang | G03F 7/70516<br>355/72 |
| 2016/0365219 | A1* | 12/2016 | Nishioka | H01J 37/20 |

FOREIGN PATENT DOCUMENTS

| | | | | |
|---|---|---|---|---|
| JP | 59080190 A | * 10/1982 | H02K 41/031 |
| JP | 59080190 | 5/1984 | |
| JP | 2010130740 A | 6/2010 | |
| JP | 2019193329 A | 10/2019 | |
| KR | 20000074216 A | 12/2000 | |
| KR | 20090013688 A | 2/2009 | |
| KR | 20120101291 A | 9/2012 | |
| KR | 20140084238 A | 7/2014 | |
| TW | 356617 B | 4/1999 | |

* cited by examiner

Figure 7:
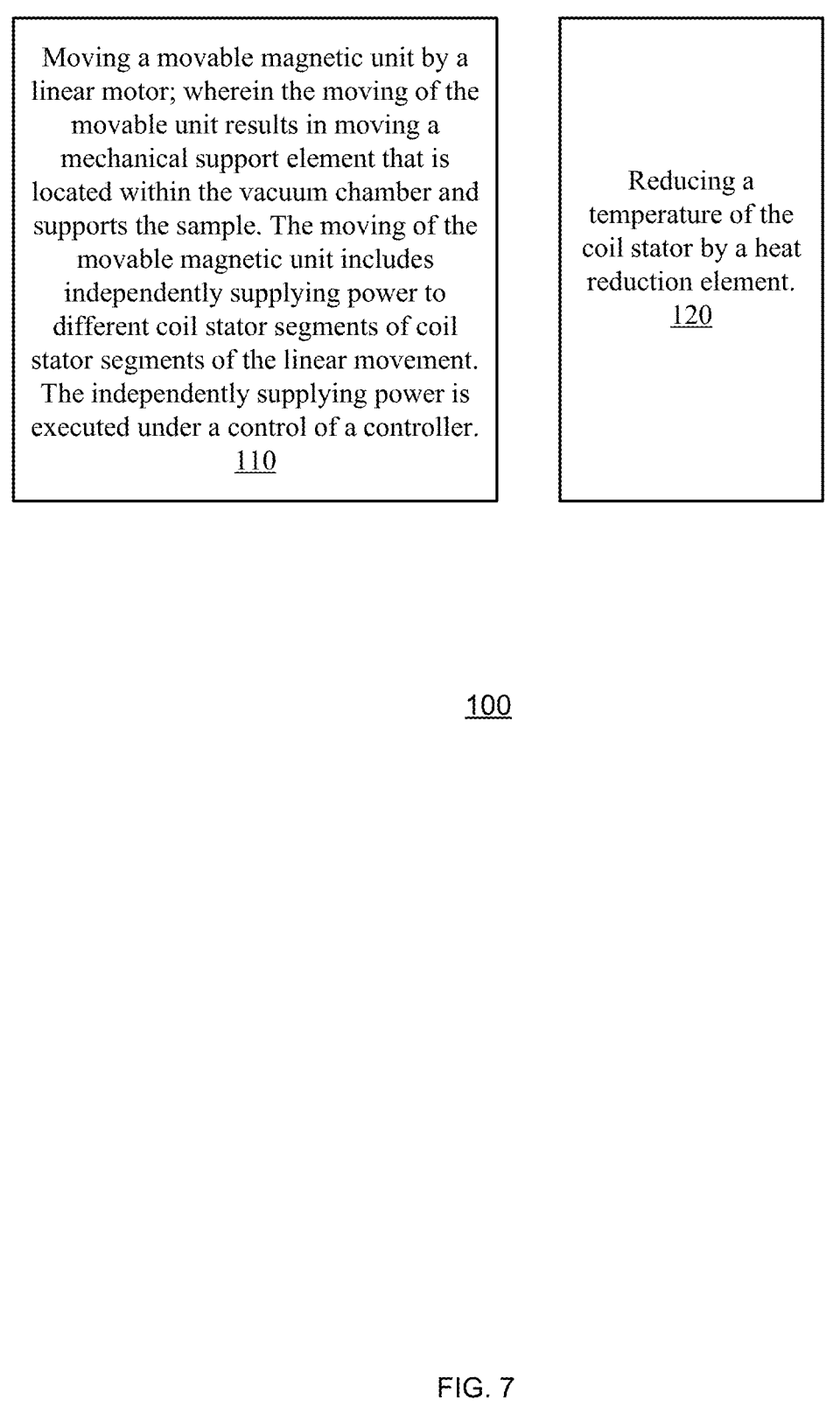

Moving a movable magnetic unit by a linear motor; wherein the moving of the movable unit results in moving a mechanical support element that is located within the vacuum chamber and supports the sample. The moving of the movable magnetic unit includes independently supplying power to different coil stator segments of coil stator segments of the linear movement. The independently supplying power is executed under a control of a controller.
110

Reducing a temperature of the coil stator by a heat reduction element.
120

POSITIONING SYSTEM

BACKGROUND OF THE INVENTION

A positioning system such as a mechanical stage is used to move a sample, along one or more axes, within a vacuum chamber.

The sample may be moved, along a path that corresponds to an axis, using a linear motor that include magnets that stretches along the entire path and moving coils that span along a lengthy segment of the path.

The moving coils receive a single actuation signal and tend to heat during the movement of the sample by the linear motor.

Heat does not dissipate (or barely dissipates) in vacuum, and the heating of the moving coils may damage the liner motor.

Heatsinking the moving coils or cooling the moving coils using water piper is either impractical or hazardous.

There is a growing need to provide a positioning system that barely heats during movement of the sample.

BRIEF SUMMARY OF THE INVENTION

There may be provided a positioning system that includes (a) a linear motor that includes a movable magnetic unit and a coil stator, the coil stator includes a group of coil stator segments; wherein the mechanical support unit is mechanically coupled to the movable magnetic unit; (b) a mechanical support element for supporting a sample within a vacuum chamber; (c) a power supply that is configured to independently supply power to different coil stator segments of the coil stator segments to induce a movement of the movable magnetic unit in relation to the coil stator, along a axis; (d) a heat reduction element that is configured to reduce a temperature of the coil stator; and (e) a controller that is configured to control the movement of the movable magnetic unit by controlling the supply of power to the different coil stator segments.

There may be provided a method for moving a sample within a vacuum chamber, the method may include (a) moving a movable magnetic unit by a linear motor; wherein the moving of the movable magnetic unit results in moving a mechanical support element that is located within the vacuum chamber and supports the sample; wherein the moving of the movable magnetic unit includes independently supplying power to different coil stator segments of coil stator segments of the linear motor; and (b) reducing a temperature of the coil stator by a heat reduction element.

BRIEF DESCRIPTION OF THE DRAWINGS

The subject matter regarded as the invention is particularly pointed out and distinctly claimed in the concluding portion of the specification. The invention, however, both as to organization and method of operation, together with specimen s, features, and advantages thereof, may best be understood by reference to the following detailed description when read with the accompanying drawings in which:

FIG. 7 illustrates an example of a method.

Figure 1:
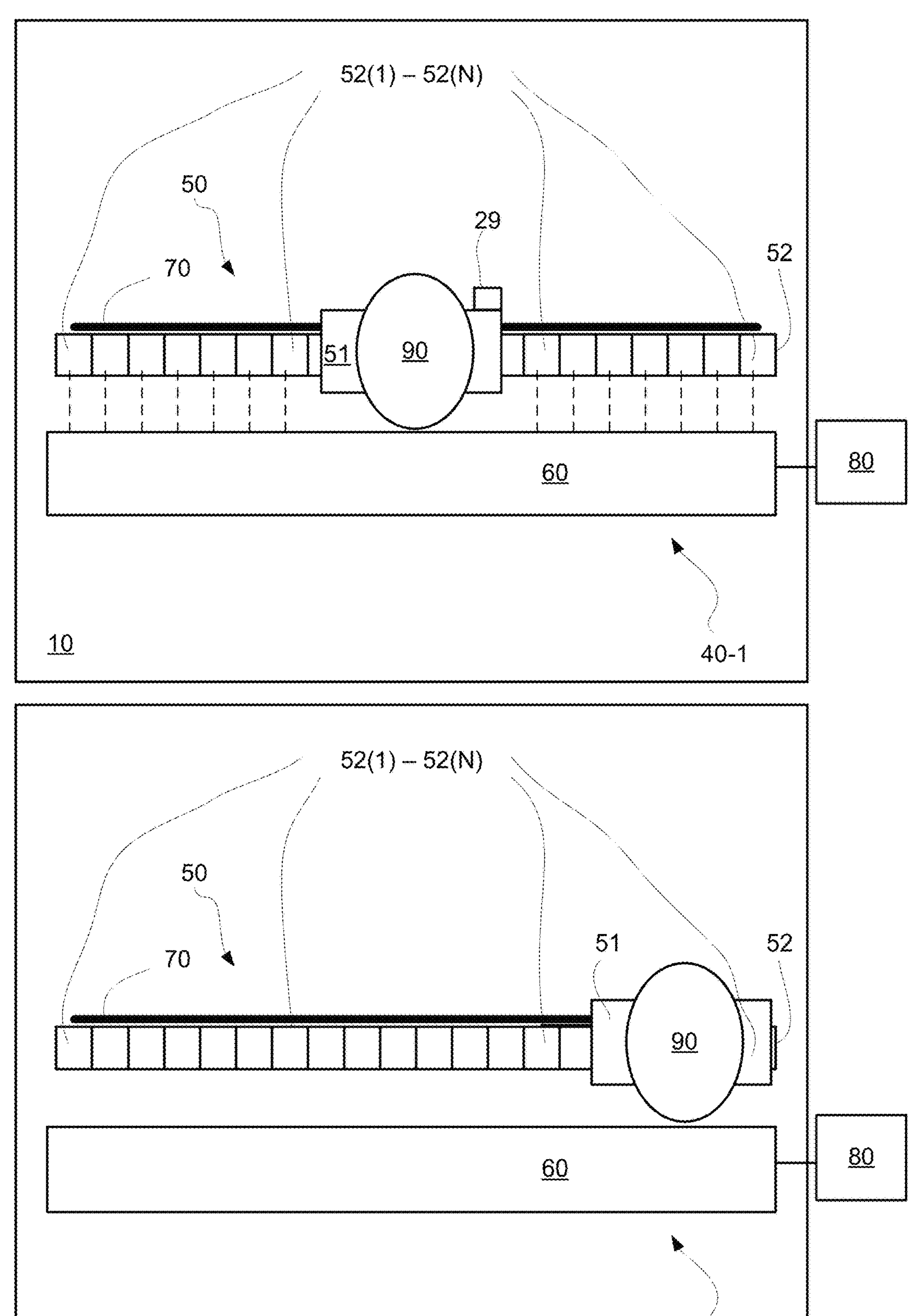
FIG. 1 illustrates an example of a positioning system and a vacuum chamber.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the embodiments of the disclosure.

However, it will be understood by those skilled in the art that the present embodiments of the disclosure may be practiced without these specific details. In other instances, well-known methods, procedures, and components have not been described in detail so as not to obscure the present embodiments of the disclosure.

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present embodiments of the disclosure and in order not to obfuscate or distract from the teachings of the present embodiments of the disclosure.

Any reference in the specification to a method should be applied mutatis mutandis to a high voltage noise reduction unit capable of executing the method.

Any reference in the specification to a high voltage noise reduction unit should be applied mutatis mutandis to a method that may be executed by the high voltage noise reduction unit.

The term and/or means additionally or alternatively. For example A and/or B means only A, or only B or A and B.

A first element is mechanically coupled to a second element when a movement of the first element impacts a movement of the second element. The first element may be directly connected to the second element, may be indirectly (via one or more intermediate elements) connected to the second element, may be in direct contact with the second element, or may not contact or be connected to the first element.

There may be provided a positioning system that may include a linear motor and may be configured to reduce the heating of the linear motor by (i) using a coil stator that includes a group of coil stator segments, and (ii) selectively supplying power, during a movement of a movable magnetic unit, only to relevant coil stator segments. Irrelevant coil stator segments may not be powered.

A relevant coil stator segment may be a coil stator segment that may impact the movement—for example a coil stator segment that is subjected to a magnetic flex of the movable magnetic unit. As the movable magnetic unit moves, new coil stator segment become relevant while other coil stator segments become irrelevant.

Accordingly—a coil stator segment is supplied with power when the coil stator segment is relevant and is not supplied with power when the coil stator segment is irrelevant. This dramatically reduces the heating of the coil stator segment. In addition—the coil stator segments are static—and can be cooled by static heat reduction element that are simpler, more effective and less hazardous than moving heat reduction elements.

FIG. 1 illustrates an example of a vacuum chamber 10 and of a positioning system 40-1 at two positions of the mechanical support element 90.

The positioning system 40-1 may include a linear motor 50, a power supply unit 60, a heat reduction element 70, a controller 80, and a mechanical support element 90.

The linear motor 50 may include a movable magnetic unit 51 and a coil stator 52. The coil stator 52 includes a group of coil stator segments 52(1)-52(N), wherein N is a positive integer.

The mechanical support unit 90 is configured to support a sample (not shown) within the vacuum chamber.

The mechanical support unit 90 is mechanically coupled to the movable magnetic unit 51 in the sense that a movement of the movable magnetic unit 51 causes a corresponding movement of the mechanical support unit 90.

The power supply unit 60 is configured to independently supply power to different coil stator segments of the coil stator segments to induce a movement of the movable magnetic unit in relation to the coil stator, along a axis. The dashed lines that extend from the power supply unit 60 to each one of the coil stator segments illustrates that the power supply unit 60 may select which of the coil stator segments will receive power at any moment.

The heat reduction element 70 is configured to reduce a temperature of the coil stator. The heat reduction element 70 is located within the vacuum chamber and is configured to dissipate the heat within the vacuum chamber. Alternatively, the heat reduction elements may extend outside the vacuum chamber if may be in thermal communication with a heat reduction element located at least in part outside the vacuum chamber. The same applies mutatis mutandis to heat reduction element 70'.

The controller 80 is configured to control the movement of the movable magnetic unit by controlling the supply of power to the different coil stator segments. The controller may be located within the vacuum chamber or outside the vacuum chamber.

The power supply unit 60 is configured to supply power, at different moments during a movement period, to different sub-groups of coil stator segments.

Figure 5:
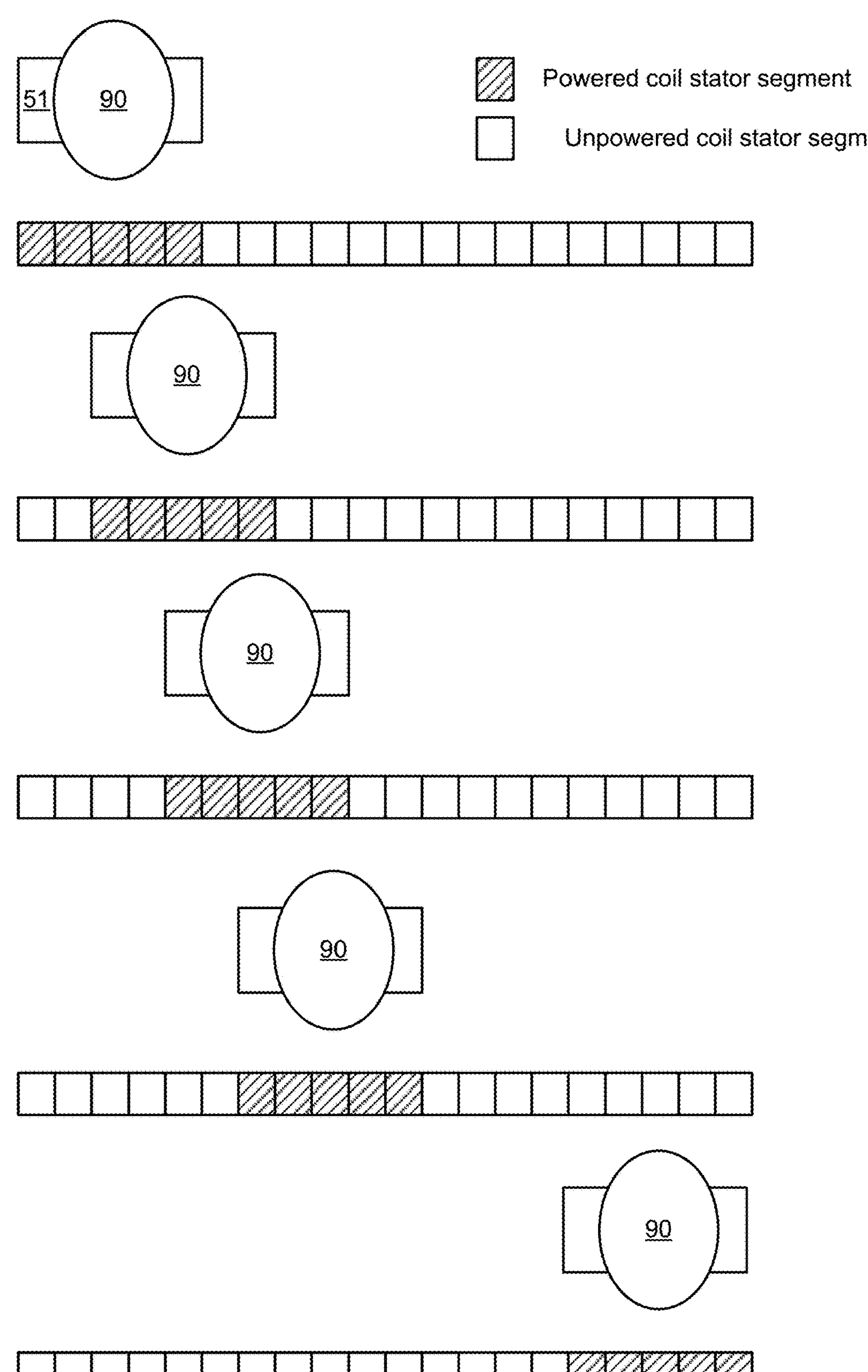
FIG. 5 illustrates an example of a provision of power during movement.

At a given moment, the power supply unit 60 is configured to supply power to a sub-group of coil stator segments that are subjected, at the given moment, to a magnetic flux generated by the movable magnetic unit. FIG. 5 illustrates the independent supply of power to only some of the coil stator segment-during different moment of a movement period in which the movable magnetic unit moves along the coil stator.

The heat reduction element may include one or more static water cooling conduits that are thermally coupled to the coil stator.

The heat reduction element 70 may be thermally coupled to any part of the coil stator segments. There may be multiple heat reduction element per the coil stator.

The upper edge of the movable magnetic unit may be positioned above the coil stator. See, for example FIG. 6 that illustrates object 30 located on mechanical support unit 90 that is located above the movable magnetic unit 51.

Referring back to FIG. 1, the positioning system 10 may include a movement sensor 29 for sensing a movement of movable magnetic unit. The movement sensor may be an encoder or any other movement sensor.

The controller 80 is configured to control the movement of the movable magnetic unit based, at least in part, on movement information generated by the movement sensor. The movement is also controlled based on a desired movement of the sample.

Figure 2:
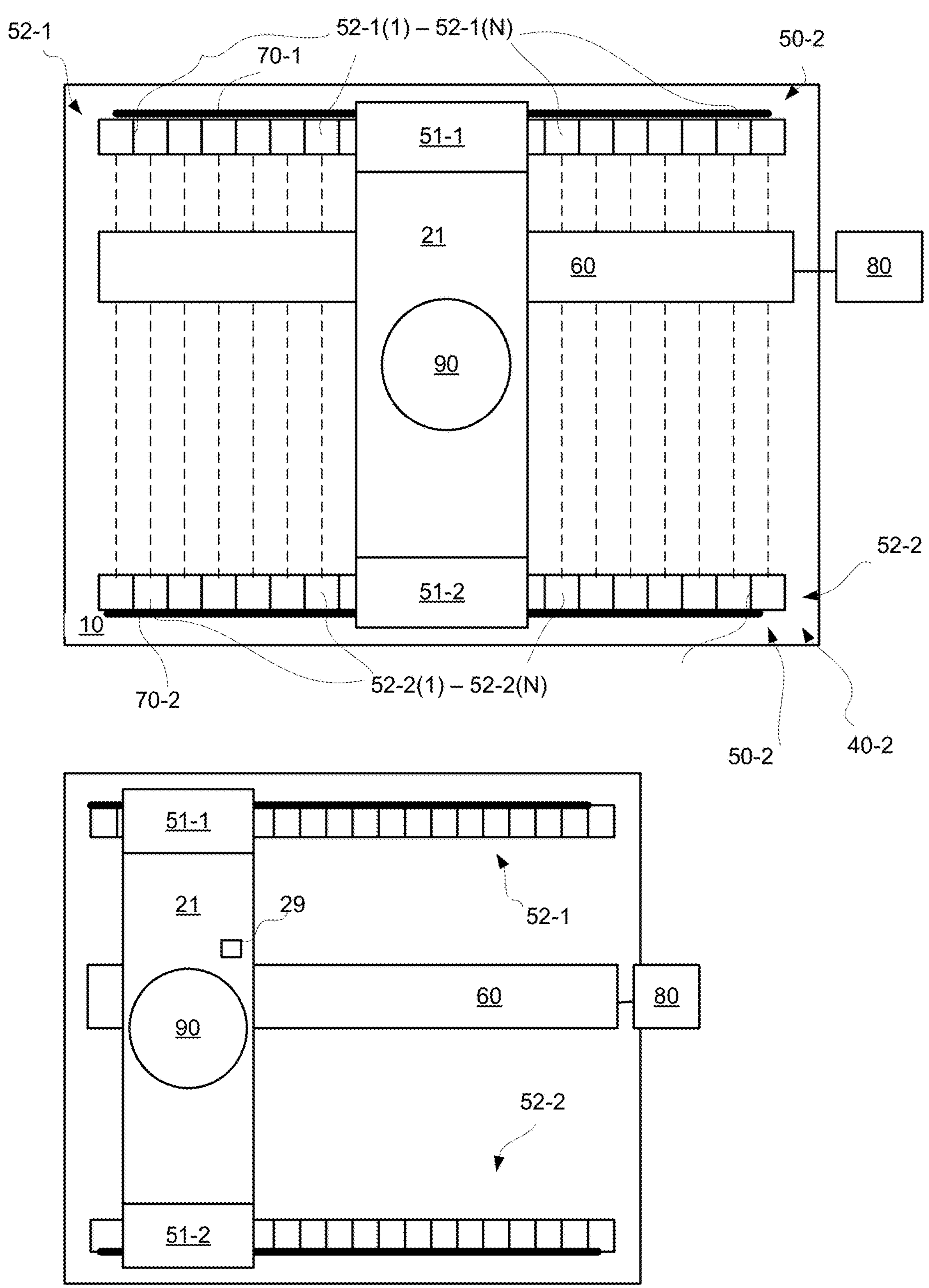
FIG. 2 illustrates an example of a positioning system and a vacuum chamber.

FIG. 2 illustrates a positioning system 40-2 that includes a first linear motor 50-1, a second linear motor 50-2, a mechanical interface 21 and mechanical support unit 90, at two positions of the mechanical support element 90.

First linear motor 50-1 includes first movable magnetic unit 51-1 and first coil stator 52-1. The first coil stator 52-1 includes a group of first coil stator segments 52-1(1)-52-1(N).

Second linear motor 50-2 includes second movable magnetic unit 51-2 and second coil stator 52-2. The second coil stator 52-2 includes a group of second coil stator segments 52-2(1)-52-2(N).

The first coil stator 52-1 is parallel to second coil stator 52-2, and the controller 80 controls the synchronized movement of first movable magnetic unit 51-1 and second movable magnetic unit 51-2.

The mechanical interface 21 is mechanically coupled to the first movable magnetic unit 51-1 and to the second movable magnetic unit 51-2 and moves along an axis due to the synchronized movement of the first movable magnetic unit 51-1 and the second movable magnetic unit 51-2.

The dashed lines that extend from the power supply unit 60 to each one of the coil stator segments of first coil stator 52-1 and to each one of the coil stator segments of second coil stator 52-2 illustrates that the power supply unit 60 may select which of the coil stator segments will receive power at any moment.

The positioning system may move along one or more axes. This may require one or more linear motors.

For example, the positioning system may move the sample along two axes, for example along two axes that are perpendicular to each other, for example along an x-axis and a y-axis.

There may be various mechanical couplings between the mechanical support element and each one of the linear motors. A first mechanical coupling includes having the first linear motor move the mechanical support element and a second linear motor may move the second linear motor. An example of the first mechanical coupling is illustrated in U.S. Patent Application 2003/0156270 illustrated and another example is the is the XY system for lithography and metrology of Schneeberger of Roggwil, Switzerland. A second mechanical coupling includes having the first linear motor and the second linear motors be independently mechanically coupled to the mechanical support element.

An example of the second mechanical coupling is the XY Twin Gantry vacuum stage of Schneeberger of Roggwil, Switzerland.

A second linear motor may be provided and may include a second movable magnetic unit and a second coil stator. The second coil stator may include a second group of second coil stator segments. The second movable mechanical unit may be mechanically coupled to the mechanical support unit. The second linear motor also includes (a) a second heat reduction element, (b) a second power supply and a second controller.

The second power supply may be configured to independently supply power to different second coil stator segments of the second coil stator segments to induce a movement of the second movable magnetic unit in relation to the second coil stator, along a second axis, and within the vacuum chamber.

The second controller may be configured to control the movement of the second movable magnetic unit by controlling the supply of power to the second different coil stator segments.

Figure 3:
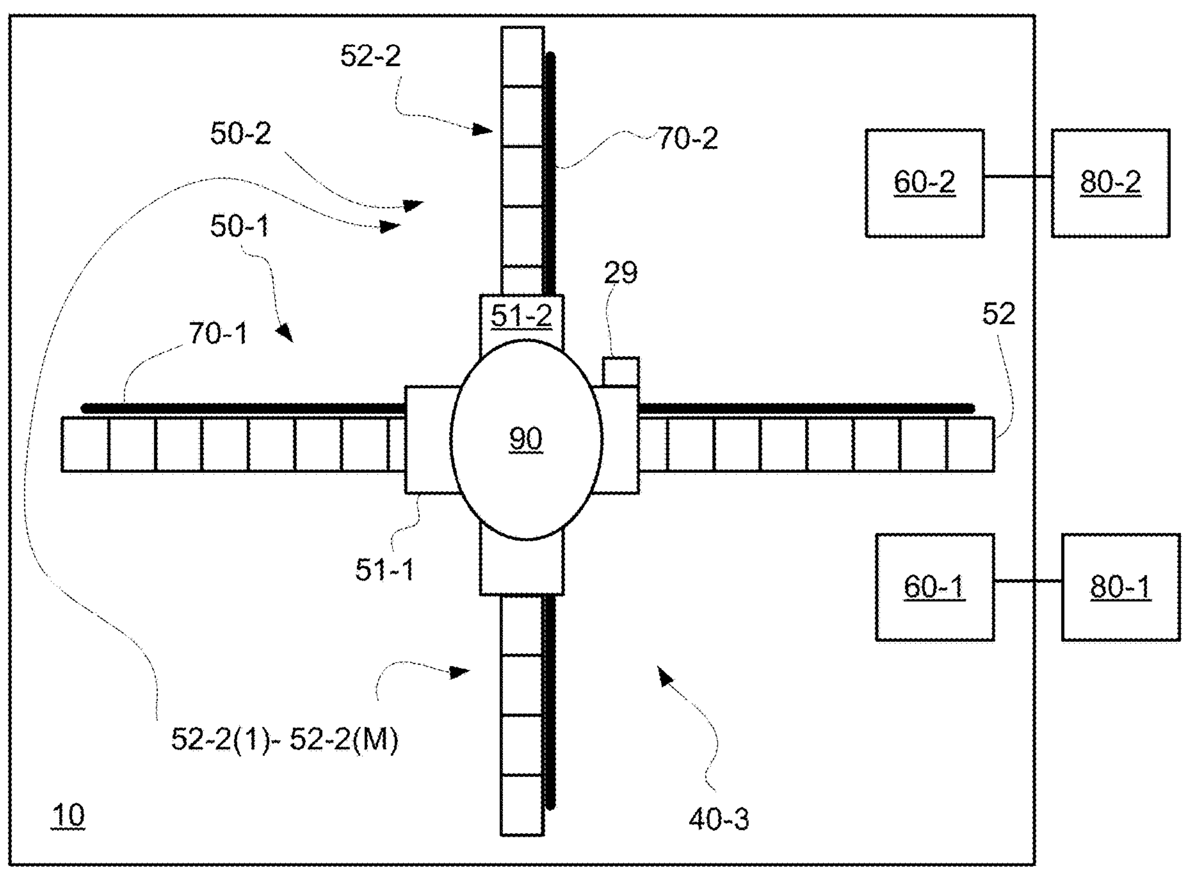
FIG. 3 illustrates an example of a positioning system and a vacuum chamber.

FIG. 3 illustrates a positioning system 40-3 that includes a first linear motor 50-1, a second linear motor 50-2, and mechanical support unit 90.

First linear motor 50-1 includes first movable magnetic unit 51-1 and first coil stator 52-1. The first coil stator 52-1 includes a group of first coil stator segments 52-1(1)-52-1(N).

Second linear motor 50-2 includes second movable magnetic unit 51-2 and second coil stator 52-2. The second coil stator 52-2 includes a group of second coil stator segments 52-2(1)-52-2(N).

The first linear motor 50-1 is configured to move the mechanical support unit 90 along a first axis. The second linear motor 50-2 is configured to move the mechanical support unit 90 along a second axis that is oriented to the first axis. In FIG. 3 the first axis is perpendicular to the second axis.

FIG. 3 also illustrates a first power supply unit 60-1, second power supply unit 60-2, first controller 80-1—and second controller 80-2. A single controller and/or a single power supply unit may be provided instead of the two controller and the two power supply units.

The first power supply unit 60-1 is configured to independently supply power to different first coil stator segments of the first coil stator segments to induce a movement of the movable magnetic unit in relation to the first coil stator, along the first axis.

The second power supply unit 60-2 is configured to independently supply power to different second coil stator segments of the second coil stator segments to induce a movement of the movable magnetic unit in relation to the second coil stator, along the second axis.

A first heat reduction element 70-1 is configured to reduce a temperature of the first coil stator.

A second heat reduction element 70-2 is configured to reduce a temperature of the second coil stator.

The first controller 80-1 is configured to control the movement of the first movable magnetic unit by controlling the supply of power to the different first coil stator segments.

The second controller 80-2 is configured to control the movement of the second movable magnetic unit by controlling the supply of power to the different second coil stator segments.

Any of the first controller and the second controller may be located within the vacuum chamber or outside the vacuum chamber.

Figure 4:
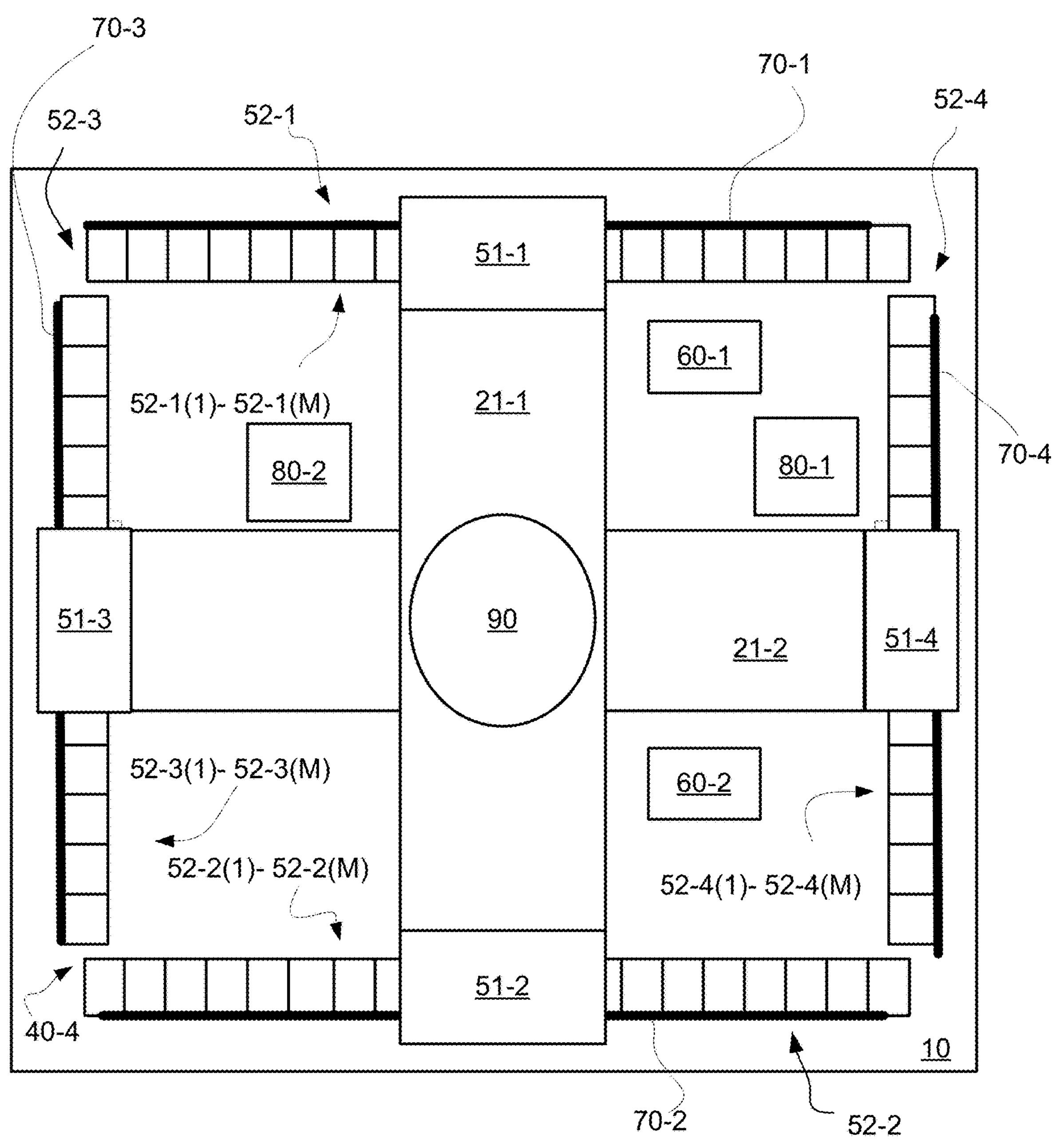
FIG. 4 illustrates an example of a positioning system and a vacuum chamber.

FIG. 4 illustrates a positioning system 40-2 that includes a first linear motor 50-1, a second linear motor 50-2, a third linear motor 50-3, a fourth linear motor 50-4, a first mechanical interface 21-1, a second mechanical interface 21-2, and mechanical support unit 90.

First linear motor 50-1 includes first movable magnetic unit 51-1 and first coil stator 52-1. The first coil stator 52-1 includes a group of first coil stator segments 52-1(1)-52-1(N).

Second linear motor 50-2 includes second movable magnetic unit 51-2 and second coil stator 52-2. The second coil stator 52-2 includes a group of second coil stator segments 52-2(1)-52-2(N).

The first coil stator 52-1 is parallel to second coil stator 52-2, and the first controller 80-1 controls the synchronized movement of first movable magnetic unit 51-1 and second movable magnetic unit 51-2.

The first mechanical interface 21-1 is mechanically coupled to the first movable magnetic unit 51-1 and to the second movable magnetic unit 51-2 and moves along a first axis due to the synchronized movement of the first movable magnetic unit 51-1 and the second movable magnetic unit 51-2.

The first power supply unit 60-1 is configured to independently supply power to different first coil stator segments of the first coil stator segments to induce a movement of the movable magnetic unit in relation to the first coil stator, along the first axis. The second power supply unit 60-2 is configured to independently supply power to different second coil stator segments of the second coil stator segments to induce a movement of the movable magnetic unit in relation to the second coil stator, along the second axis.

A first heat reduction element 70-1 is configured to reduce a temperature of the first coil stator.

A second heat reduction element 70-2 is configured to reduce a temperature of the second coil stator.

The first controller 80-1 is configured to control the movement of the first movable magnetic unit by controlling the supply of power to the different first coil stator segments.

The second controller 80-2 is configured to control the movement of the second movable magnetic unit by controlling the supply of power to the different second coil stator segments.

Third linear motor 50-3 includes third movable magnetic unit 51-3 and third coil stator 52-3. The third coil stator 52-3 includes a group of third coil stator segments 52-3(1)-52-3(M).

Fourth linear motor 50-4 includes fourth movable magnetic unit 51-4 and fourth coil stator 52-4. The fourth coil stator 52-4 includes a group of fourth coil stator segments 52-4(1)-52-4(M).

The third coil stator 52-3 is parallel to fourth coil stator 52-4, and the third controller 80-3 controls the synchronized movement of third movable magnetic unit 51-3 and fourth movable magnetic unit 51-4.

The third mechanical interface 21-3 is mechanically coupled to the third movable magnetic unit 51-3 and to the fourth movable magnetic unit 51-4 and moves along a second axis due to the synchronized movement of the third movable magnetic unit 51-3 and the fourth movable magnetic unit 51-4.

The third power supply unit 60-3 is configured to independently supply power to different third coil stator segments of the third coil stator segments to induce a movement of the movable magnetic unit in relation to the third coil stator, along the second axis.

The fourth power supply unit 60-4 is configured to independently supply power to different fourth coil stator segments of the fourth coil stator segments to induce a movement of the movable magnetic unit in relation to the fourth coil stator, along the second axis.

A third heat reduction element 70-3 is configured to reduce a temperature of the third coil stator.

A fourth heat reduction element 70-4 is configured to reduce a temperature of the fourth coil stator.

The third controller 80-3 is configured to control the movement of the third movable magnetic unit by controlling the supply of power to the different third coil stator segments.

The fourth controller 80-4 is configured to control the movement of the fourth movable magnetic unit by controlling the supply of power to the different fourth coil stator segments.

FIG. 5 illustrates the independent supply of power to only some of the coil stator segment-during different moment of a movement period in which the movable magnetic unit moves along the coil stator. The powered coil stator segments are subjected to the magnetic flux of the stator segment and may be located directly below the movable magnetic unit.

Figure 6:
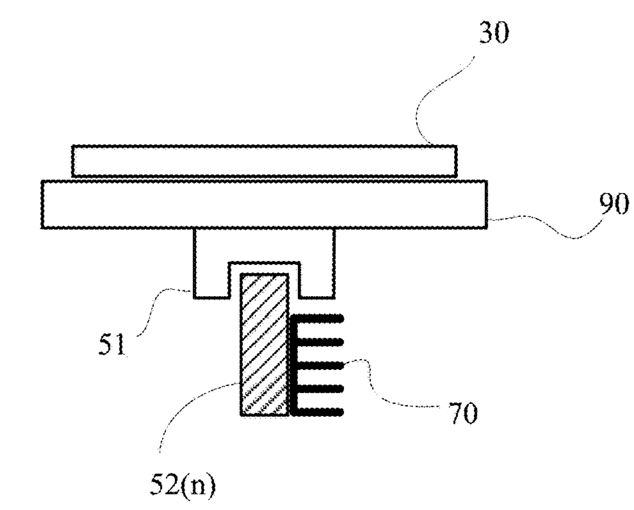
FIG. 6 illustrates an example of parts of the positioning system.
Figure 6:
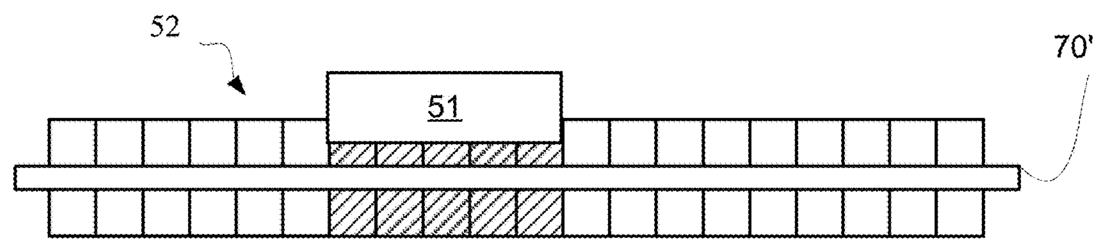

FIG. 6 illustrates examples of heat reduction elements. In one example the heat reduction element 70 is a heatsink that is thermally coupled to the coil stator. In another example the heat reduction element 70 is a static water cooling conduit that is thermally coupled to multiple coil stator segments.

FIG. 7 is an example of a method 100 for moving a sample within a vacuum chamber.

Method 100 may be executed by any of the positioning systems illustrated in the application.

Method 100 may include steps 110 and 120.

Step 110 may include moving a movable magnetic unit by a linear motor; wherein the moving of the movable magnetic unit results in moving a mechanical support element that is located within the vacuum chamber and supports the sample. The moving of the movable magnetic unit includes independently supplying power to different coil stator segments of coil stator segments of the linear motor.

The independently supplying power is executed under a control of a controller.

Step 110 may include supplying power, at different moments during a movement period, to different sub-groups of coil stator segments.

Step 110 may include supplying, at a given moment, power to a sub-group of coil stator segments that are subjected, at the given moment, to a magnetic flux generated by the movable magnetic unit.

Step 120 may include reducing a temperature of the coil stator by a heat reduction element.

In the foregoing specification, the embodiments of the disclosure have been described with reference to specific examples of embodiments. It will, however, be evident that various modifications and changes may be made therein without departing from the broader spirit and scope of the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any reference to the term "comprising" or "having" or "including" should be applied mutatis mutandis to "consisting" and/or should be applied mutatis mutandis to "consisting essentially of".

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to embodiments containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the embodiments have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A positioning system, comprising:

a linear motor that comprises a movable magnetic unit and a coil stator comprising a plurality of coil stator segments;

a mechanical support element mechanically coupled to the movable magnetic unit and configured to support a sample within a vacuum chamber;

a power supply element configured to independently supply power to different coil stator segments of the plurality of coil stator segments to induce a movement of the movable magnetic unit in relation to the coil stator along a axis;

a heat reduction element configured to reduce a temperature of the coil stator;

a sensor configured to provide position feedback indicating alignment between the movable magnetic unit and the coil stator segments; and a controller configured to receive the position feedback from the sensor and, in response, control the power supply element to selectively supply power to dynamically energize only those coil stator segments that are contemporaneously aligned with the movable magnetic unit, and prevent the power supply element from supplying power to coil stator segments not aligned with the movable magnetic unit, thereby minimizing heat generation in the coil stator segments not aligned with the movable magnetic unit during operation.

2. The positioning system according to claim 1 wherein the controller is configured to control the power supply element to supply power, at different moments during a movement period, to different sub-groups of coil stator segments.

3. The positioning system according to claim 2 wherein at a given moment, the controller is configured to control the power supply element to supply power to a sub-group of coil stator segments that are subjected, at the given moment, to a magnetic flux generated by the movable magnetic unit.

4. The positioning system according to claim 1 wherein the heat reduction element comprises one or more heatsinks that are thermally coupled to the coil stator.

5. The positioning system according to claim 1 wherein the heat reduction element comprises one or more static water cooling conduits that are thermally coupled to the coil stator.

6. The positioning system according to claim 1 wherein an upper edge of the movable magnetic unit is positioned above the coil stator.

7. The positioning system according to claim 1 wherein the linear motor is a first linear motor, and wherein the positioning system further comprising:

a second linear motor that comprises a second movable magnetic unit and a second coil stator; wherein the second coil stator comprises a second group of second coil stator segments; wherein the second movable magnetic unit is mechanically coupled to the mechanical support unit; and wherein the power supply element is further configured to independently supply power to different second coil stator segments of the second coil stator segments to induce a movement of the second movable magnetic unit in relation to the second coil stator, along a second axis, and within the vacuum chamber; and wherein the controller is further configured to control the movement of the second movable magnetic unit by controlling the supply of power to the second different coil stator segments.

8. A method for moving a sample within a vacuum chamber, the method comprises:

providing a positioning system comprising a linear motor having a coil stator with a plurality of coil stator segments, a movable magnetic unit, a mechanical support element mechanically coupled to the movable magnetic unit, a power supply element operably coupled to the coil stator segments, a sensor configured to provide position feedback indicating alignment between the movable magnetic unit and the coil stator segments, and a controller operably coupled to the sensor and the power supply;

sensing, with the sensor, a position of the movable magnetic unit relative to the coil stator segments and providing position feedback to the controller;

controlling, by the controller in response to said position feedback, the power supply element to selectively supply power only to dynamically energize only those coil stator segments that are contemporaneously aligned with the movable magnetic unit, and to prevent the power supply from supplying power to coil stator segments not contemporaneously aligned with the movable magnetic unit, thereby moving the movable magnetic unit by energizing said selected coil segments while minimizing heat generation in the coil stator segments not contemporaneously aligned with the movable magnetic unit, wherein the moving of the movable magnetic unit results in moving a mechanical support element that is located within the vacuum chamber and supports the sample; and reducing a temperature of the coil stator by a heat reduction element.

9. The method according to claim 8 comprising supplying power, at different moments during a movement period, to different sub-groups of coil stator segments.

10. The method according to claim 8 wherein at a given moment, supplying power to a sub-group of coil stator segments that are subjected, at the given moment, to a magnetic flux generated by the movable magnetic unit.

11. A positioning system, comprising:

a first linear motor that comprises a first movable magnetic unit and a first coil stator comprising a plurality of first coil stator segments;

a mechanical support element coupled to move with the first movable magnetic unit and configured to support a sample within a vacuum chamber;

a power supply element configured to independently supply power to different coil stator segments of the first plurality of coil stator segments to induce a movement of the first movable magnetic unit in relation to the first coil stator along an axis;

a first heat reduction element comprising a first continuous thermal conduit physically and thermally coupled to the first coil stator;

a sensor coupled to move with the mechanical support and configured to provide position feedback indicating alignment between the movable magnetic unit and the plurality of first coil stator segments; and a controller configured to receive the position feedback from the sensor and, in response, control the power supply element to selectively supply power to dynamically energize only those coil stator segments of the plurality of first coil stator segments that are contemporaneously physically aligned with the first movable magnetic unit and prevent the power supply element from supplying power to coil stator segments of the plurality of first coil stator segments that are not contemporaneously physically aligned with the first movable magnetic unit thereby minimizing heat generation in the coil stator segments of the first coil stator not contemporaneously physically aligned with the first movable magnetic unit during operation.

12. The positioning system set forth in claim 11 further comprising:

a second linear motor that comprises a second movable magnetic unit and a second coil stator comprising a second plurality of coil stator segments;

a mechanical interface mechanically coupled to the mechanical support element and to both the first movable magnetic unit and the second movable magnetic unit; and a second heat reduction element comprising a second continuous thermal conduit physically and thermally coupled to the second coil stator;

wherein the power supply element is further configured to independently supply power to different coil stator segments of the plurality of second coil stator segments to induce a movement of the second movable magnetic unit in relation to the second coil stator along an axis; and wherein the controller is further configured to control, in response to position feedback from the sensor, the power supply element to selectively supply power to dynamically energize only those coil stator segments of the plurality of second coil stator segments that are contemporaneously physically aligned with the second movable magnetic unit and prevent the power supply element from supplying power to coil stator segments of the second plurality of coil stator segments that are not contemporaneously physically aligned with the second movable magnetic unit thereby minimizing heat generation in the coil stator segments of the second coil stator not contemporaneously physically aligned with the second movable magnetic unit during operation.

* * * * *